United States Patent [19]

Sage et al.

[11] Patent Number: 5,055,224
[45] Date of Patent: Oct. 8, 1991

[54] LIQUID CRYSTAL PHASE

[75] Inventors: Ian C. Sage, Broadstone; Michael K. Chambers, Poole, both of Great Britain

[73] Assignee: Merck Patent Gesellschaft Mit Beschränkter Haftung, Darmstadt, Fed. Rep. of Germany

[21] Appl. No.: 328,191

[22] PCT Filed: May 18, 1988

[86] PCT No.: PCT/EP88/00426

§ 371 Date: Jan. 27, 1989

§ 102(e) Date: Jan. 27, 1989

[87] PCT Pub. No.: WO88/09360

PCT Pub. Date: Dec. 1, 1988

[30] Foreign Application Priority Data

May 27, 1987 [GB] United Kingdom ............... 8712464

[51] Int. Cl.$^5$ .................. C09K 19/30; G02F 1/13
[52] U.S. Cl. .................. 252/299.63; 252/299.6; 252/299.01; 252/299.61; 359/102; 359/106
[58] Field of Search ............. 252/299.01, 299.63, 252/299.61; 350/350 R

[56] References Cited

U.S. PATENT DOCUMENTS

| | | | |
|---|---|---|---|
| 4,368,135 | 1/1983 | Osman | 252/299.63 |
| 4,372,871 | 2/1983 | Toriyama et al. | 252/299.61 |
| 4,405,488 | 9/1983 | Sugimori et al. | 252/299.63 |
| 4,455,443 | 6/1984 | Takatsu et al. | 252/299.63 X |
| 4,695,131 | 9/1987 | Balkwill et al. | 350/350 R |
| 4,695,398 | 9/1987 | Goto et al. | 252/299.63 X |
| 4,741,859 | 5/1988 | McDonnell et al. | 252/299.63 |
| 4,797,228 | 1/1989 | Goto et al. | 252/299.63 |
| 4,808,333 | 2/1989 | Huynh-ba et al. | 252/299.63 |
| 4,877,547 | 10/1989 | Weber et al. | 252/299.63 X |
| 4,877,549 | 10/1989 | Sawada et al. | 252/299.63 |
| 4,886,621 | 12/1989 | Sage et al. | 252/299.63 X |
| 4,923,632 | 5/1990 | Sawada et al. | 252/299.63 X |
| 5,002,694 | 3/1991 | Wächtler et al. | 252/299.63 X |

FOREIGN PATENT DOCUMENTS

| | | | |
|---|---|---|---|
| 0117631 | 9/1984 | European Pat. Off. | 252/299.63 |
| 0216672 | 4/1987 | European Pat. Off. | 252/299.63 |
| 3339216 | 5/1984 | Fed. Rep. of Germany | 252/299.63 |
| 86/03769 | 7/1986 | World Int. Prop. O. | 252/299.63 |
| 88/02018 | 3/1988 | World Int. Prop. O. | 252/299.63 X |

Primary Examiner—John S. Maples
Assistant Examiner—Richard Treanor
Attorney, Agent, or Firm—Millen, White & Zelano

[57] ABSTRACT

A liquid crystal phase consisting of at least three components A, B and C, each of which contains one or more compounds, wherein component A has a viscosity of at most about 25 mPa.s at 20°, a clearing point of at most 130° and a dielectric anisotropy between about −2 and about +2, component B has a dielectric anisotropy above about +8, component C has a clearing point of more than 130° and a dielectric anisotropy between about −2 and about +2, characterized in that component A contains at least one compound of the formula III

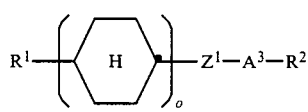

III in which
R$^1$ is alkyl of 1 to 12 C atoms, in which in addition one or two non-adjacent CH$_2$ groups can be replaced by O atoms, —CO—, —O—CO—, —CO—O— and/or —CH=CH— groups,
R$^2$ has one of the meanings of R$^1$,

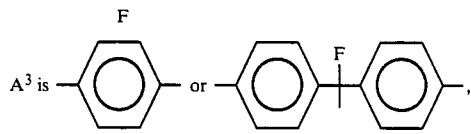

Z$^1$ is —CO—O—, —O—CO— or —CH$_2$CH$_2$—,
o is 1 or, if A$^3$ is

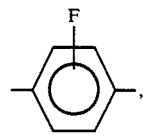

also 2,
Cy is trans-1,4-cyclohexylene, and
Phe is 1,4-phenylene, has suitable material properties for use in supertwisted nematic cells.

9 Claims, No Drawings

LIQUID CRYSTAL PHASE

The invention relates to liquid crystal phases (LC phases) having elastic and dielectric properties appropriate for use in supertwisted nematic cells.

Liquid crystal display cells can be made to support more than 90° of twist in the liquid crystal layer by a combination of offset alignment directions at the surfaces, and incorporation of chiral additives. If the twist angle is increased in this way, the slope of the threshold characteristic increases and eventually becomes vertical. Further increase of the twist angle will result in bistable behaviour, but at the onset of bistability the very steep switching curve allows high level multiplex drive using conventional RMS waveforms. The limit to the increase of twist angle is set by a scattering texture which becomes stabilised as the cholesteric pitch is shortened; the effect can be alleviated but not eliminated by increasing the surface tilt in the cell.

The term "supertwisted nematic cell" includes all cells with clearly more than 90° of twist, e.g. the cells using a Guest-Host mode (C. M. Waters, V. Brimmell and E. P. Raynes, Proc. 3. Int. Display Research Conference, Kobe (1983) 396; C. M. Waters, V. Brimmell and E. P. Raynes, Proc. SID 25/4 (1984) 261), a birefringence mode (T. J. Scheffer and J. Nehring, Appl. Phys. Lett. 45 (1984) 1021; T. J. Scheffer and J. Nehring, J. Appl. Phys. 58 (1985) 3022), Black & White STN-LCD's (optical mode interference) (M. Schadt and F. Leenhouts, Appl. Phys. Lett. 50 (1987) 236; K. Kawasaki, K. Yamada, R. Watanabe and K. Mizunoya, Proc. SID '87 Digest (1987) 391), HBELCD's (K. Kinugawa, Y. Kando, M. Kanasaki, H. Kawakami and E. Kaneko), Double Layer Black & White STN LCD's (K. Katoh, Y. Endo, M. Akatsuka, M. Ohgawara and K. Sawada).

By comparison with the standard twisted nematic display, the supertwist nematic cell has important differences in behaviour. Because light guiding through the highly twisted structure is imperfect, the cells are commonly operated in a variable birefringence mode and this, together with a strong dependence of threshold voltage on cell thickness, means that a high accuracy of cell spacing is required. In order to minimise the change in materials properties with temperature, a relatively high clearing point is desirable in the mixture. A near optimal optical performance can be obtained, e.g. by setting $d\Delta n \cong 0.73$ for the 270° twist cell and adjusting the polariser orientation if necessary to obtain the best contrast.

Because of the large number of interacting cell and material properties which contribute to the performance of the supertwisted nematic display, it is highly difficult to select combinations of materials to suit the parameters of the cell for best performance.

There is thus still a great need for liquid crystal phases having suitable material properties for use in supertwisted nematic display cells.

The invention has for its object to prepare liquid crystal phases which have a nematic phase including room temperature and exhibit elastic and dielectric properties appropriate for use in supertwist cells.

It has now been found that the liquid crystal phases having particularly favorable combinations of material properties are obtained when they consist of at least three components A, B, and C, each of which contains one or more compounds, wherein component A has a viscosity of at most about 25 mPa.s at 20°, a clearing point of at most 130° and a dielectric anisotropy between about −2 and about +2, component B has a dielectric anisotropy above about +8, component C has a clearing point of more than 130° and a dielectric anisotropy between about −2 and about +2, characterized in that component A contains at least one compound of the formula III

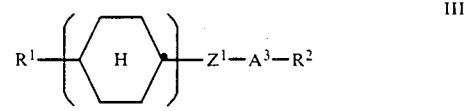

in which
R$^1$ is alkyl of 1 to 12 C atoms, in which in addition one or two nonadjacent CH$_2$ groups can be replaced by 0 atoms, —CO—, —O—CO—, —CO—O— and/or —CH=CH— groups,
R$^2$ has one of the meanings of R$^1$,

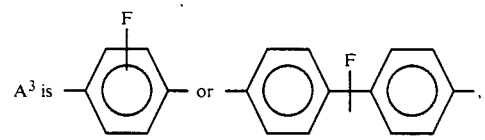

Z$^1$ is —CO—O—, —O—CO— or —CH$_2$CH$_2$—,
o is 1 or, if A$^3$ is

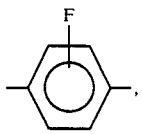

also 2,
Cy is trans-1,4-cyclohexylene, and
Phe is 1,4-phenylene.

The liquid crystal phases according to the invention exhibit favorable elastic constants, i.e. relatively low K$_{11}$ and K$_{22}$ values, relatively high K$_{33}$ values and very favorable K$_{33}$/K$_{11}$ and K$_{33}$/K$_{22}$ relationship for use in supertwisted nematic cells.

The invention thus provides the above-described liquid crystal phases for use in supertwisted nematic cells which may also contain one or more suitable chiral additives to obtain the desired d/p relationship.

The invention further provides supertwisted nematic liquid crystal display elements, in particular supertwisted nematic display elements which contain such phases.

Such phases preferably consist of at least about 10 wt. % of component A, at least about 15 wt. % of component B and at least about 5 wt. % of component C and particularly of about 40 to 70 % wt. % (favorably about 50 wt. %) of component A, about 30 to 50 wt. % (favorably about 40 wt. %) of component B and about 5 to 30 wt. % (favorably about 10 wt. %) of component C. The amount of compounds of formula III in the total mixture conveniently amounts to at least about 10 wt. % and preferably about 20 to 60 wt. % (favorably about 50 wt. %).

Compounds having the above properties required for the components A, B and C are basically known to the person skilled in the art. The total mixture must have nematic or cholesteric properties. Component A can be nematic or of monotropic liquid crystalline behaviour or, as long as the total mixture is nematic, also smectic. However, there are preferred those mixtures in which at least one compound of component A is enantiotropic liquid crystalline and there are especially preferred those mixtures in which components A, B and C are enantiotropic liquid crystalline.

Compounds and mixtures which are suitable as component A, B and C are to a large extent known and many of them are also commercially available. The following compounds or their mixtures are especially suitable for or as components A:

$$R^1-Cy-Phe-R^2$$

$$R^1-Cy-Cy-R^2$$

$$R^1-Cy-Phe-Phe-R^2$$

$$R^1-Cy-Cy-Phe-R^2$$

Preferred compounds of the formula III are those of the formulae IIIa to IIIg:

| | |
|---|---|
| $R^1-Cy-Cy-OOC-PheF-R^2$ | IIIa |
| $R^1-Cy-Cy-CH_2CH_2-Phe-F-R^2$ | IIIb |
| $R^1-Cy-Cy-COO-PheF-R^2$ | IIIc |
| $R^1-Cy-COO-PheF-R^2$ | IIId |
| $R^1-Cy-CH_2CH_2PheF-R^2$ | IIIe |

$$R^1-Cy-COO-Phe\underset{|}{\overset{F}{-}}Phe-R^2 \qquad IIIf$$

$$R^1-Cy-CH_2CH_2-Phe\underset{|}{\overset{F}{-}}Phe-R^2 \qquad IIIg$$

wherein PheF is

[structures: fluorinated phenylene groups] or [structure], preferably

[structure: monofluorophenylene]

, and $$-Phe\underset{|}{\overset{F}{-}}Phe \text{ is } [\text{structure: difluorobiphenylene}].$$

Compounds of the formulae IIIc, IIId and IIIg are particularly preferred.

Component A has favorably a viscosity of at most about 20, in particular at most 18 mPa.s at 20° and a clearing point of at most 120°.

For or as component B there are suitable, for example, known compounds containing 2 or 3 p-phenylene or trans-1,4-cyclohexylene groups, a polar end group and optionally a lateral halogen substituent. Compounds which are suitable for or as components B are, for example, the known compounds of formula I and/or formula II:

$$R^1-(A^o)_m-A^1-Z-[\text{phenyl with } X^2, X^1] \qquad I$$

in which
R1 is alkyl of 1 to 12 C atoms, in which in addition one or two nonadjacent $CH_2$ groups can be replaced by 0 atoms, —CO—, —O—CO—, —CO—O— and/or —CH=CH— groups,
$A^o$ and $A^1$ are each, independently of each other, Cy, Dio, Pyr or Phe,
Z is —CO—O—, —O—CO—, $CH_2$—O—, —O—$CH_2$— or a single bond,
$X^1$ is F, Cl or —CN,
$X^2$ is F or Cl,
m is 0 or 1,
Cy is trans-1,4-cyclohexylene,
Pyr is pyrimidine-2,5-diyl or pyridine-2,5-diyl,
Dio is trans-1,3-dioxane-2,5-diyl and
Phe is 1,4-phenylene.

$$R^1-A^4-Phe-CN \qquad II$$

in which
$A^4$ is Cy, Cy—CH Phe, Dio, Phe—COO, Cy—COO, Phe—Phe, Phe—COO—Phe, Cy—Phe—COO—Phe, Phe—Phe—COO—Phe, Cy—Cy, Cy—Cy—$CH_2CH_2$, Cy—$CH_2CH_2$—Cy, Cy—Phe or Cy—COO—Phe
and $R^1$, Cy and Phe have the meanings indicated above.

Further compounds which are suitable for or as components are

[structure: $R^1$—cyclohexyl—cyclohexyl—CN]

and/or

[structure: $R^1$—cyclohexyl—$CH_2CH_2$—cyclohexyl—CN]

in which $R^1$ has the meaning indicated above.

Compounds which are suitable for or as components C are, for example, the known compounds of the following formulae:

$$R^1-Cy-Phe-Phe-R^2$$

$$R^1-Cy-Cy-Phe-R^2$$

$$R^1-Cy-Cy-Cy-R^2$$

R¹—Cy—Z¹—Phe—Z¹—Phe—R²

R¹—Cy—Z¹—Cy—Z¹—Phe—R²

R¹—Cy—Cy—Z¹—Phe—R²

R¹—Cy—Cy—Cy—Phe—R²

R¹—Cy—Cy—Z¹—Cy—R²

R¹—Cy—Z¹—Cy—Z6hu 1—Cy—R²

R¹—Cy—Phe—Phe—Cy—R²

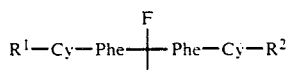

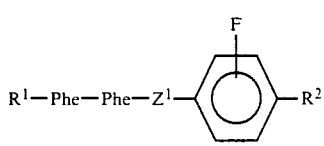

R¹Cy—Z¹—Phe—Phe—Cy—R²

Component C has favorably a clearing point of at least about 140°. Preferably component C contains at least one compound with a clearing point of at least 180°, preferably of at least 200°.

Further compounds which are suitable for or as components C are those of the formula IV $$R^1—A^2—(Z^2—A^2)_2—R^2 \quad \text{IV}$$

in which $Z^2$ independently is —CO—O— or —O—CO—, $A^2$ is Cy or Phe and $R^1$ and $R^2$ independently have the meanings indicated above.

The individual compounds of the formula I to IV of the liquid crystal phases according to the invention are either known or preparable by methods which are easily derivable by those skilled in the art from the prior art, since they are based on standard methods described in the literature.

Corresponding compounds of the formula I are described for example in German Patent Applications P 34 05 914 and P 35 15 633; in European Patent Specification 0,019,665; in S. M. Kelly and Hp. Schad, Helvetica Chimica Acta, 67, 1580-1587 (1984); in S. M. Kelly, ibid, 67, 1572-1579 (1984); in Japanese Offenlegungsschrift 59-191,789 and European Offenlegungschriften 0,099,099 and 0,119,756. Compounds of the formula II are described for example in German Offenlegungsschriften 29 44 905, 31 12 185, 31 46 249, 31 50 761, 31 50 763, 32 07 114, 32 27 916, 33 02 218, 33 34 054, in European Offenlegungsschrift 0,122,389, in U.S. Pat. No. 4,322,354 and in Japanese Offenlegungsschrift 56-164,179.

It was found, surprisingly, that the combination according to the invention of components A, B and C gives LC phases for use in supertwisted nematic cells which on the one hand have favorable elastic properties, wide mesophase ranges with low melting points and low smectic-nematic transition temperatures and on the other hand are capable of multiplexed drive by virtue of their good electro-optic steepness and viewing angle characteristic.

The LC phases according to the invention preferably contain at least two compounds, in particular at least three compounds, of the formula III and preferably at least two compounds, in particular at least three compounds, selected from the formulae I and II. Preferably at least one compound of formula I is present.

$X^1$ is preferably CN. $X^2$ is preferably fluorine. Z is preferably —CO—O—. $R^1$ is preferably alkyl, alkenyl, alkoxy or alkoxymethyl in each case with 1 to 7 C atoms, in particular alkyl or alkoxymethyl. $(A^o)_m—A^1$ is preferably Phe, CyPhe, PhePhe or PyrPhe, in particular Phe or CyPhe. Preferred compounds of the formula I are those of the partial formulae Ia to Is:

Ia
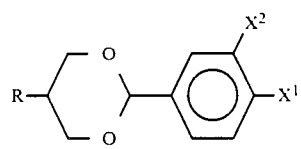

Ib
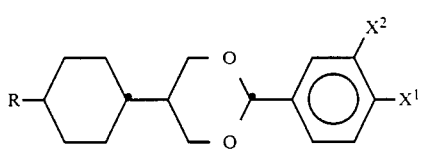

Ic
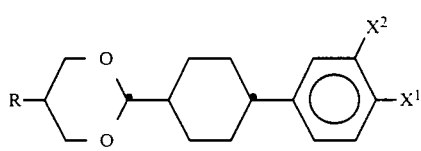

Id
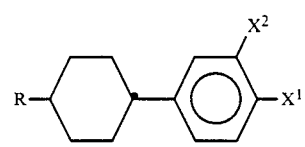

Ie
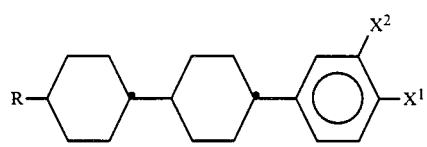

If
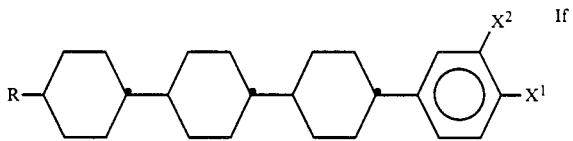

Ig
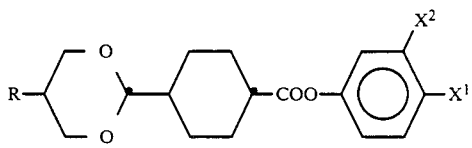

Ih
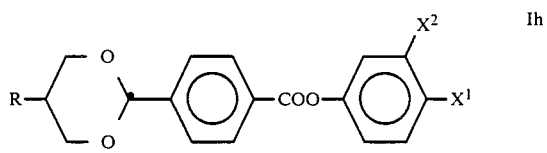

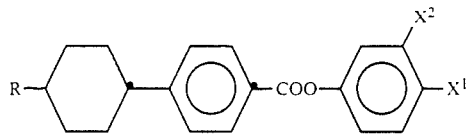  Ih

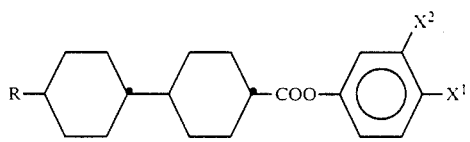  Ii

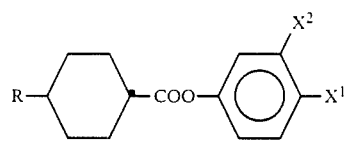  Ik

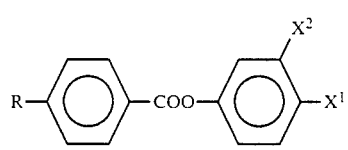  Il

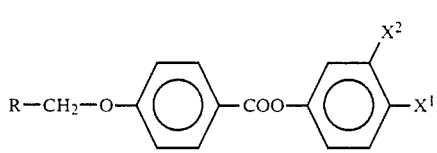  Im

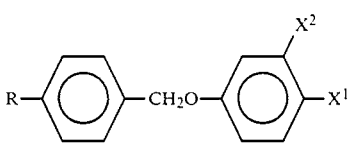  In

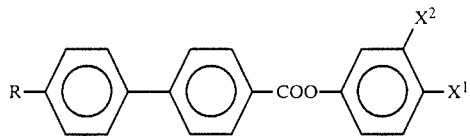  Io

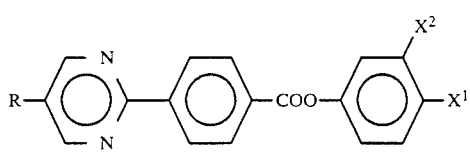  Ip

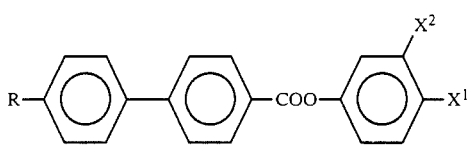  Iq

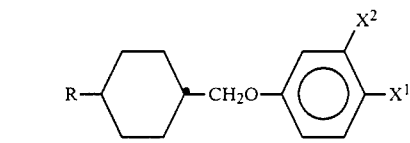  Ir

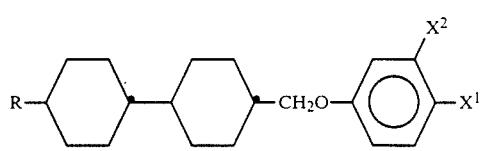  Is

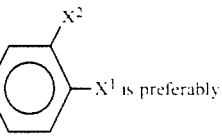  Ii

The group 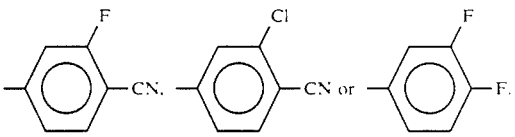 is preferably  Ij $R^1$ is preferably straight-chain alkyl of 2 to 7 C atoms. Z is in the case of compounds of the formula I preferably —CO—O—, —CH—O— or a single bond. $X^2$ is preferably fluorine.

Of the foregoing partial formulae, those of the formulae Ia, Ib, Ic, Id, Ie, Ig, Ih, Ii, Ij, Ik, Il, Im, Io, Ip, Ir and Is are preferred. Particular preference is given to those of the partial formulae Ia–Ic, Ig, Ih, Im and Ip.

In the case of the compounds of the foregoing partial formulae, R is a straight-chain alkyl group, preferably of 1 to 7 C atoms, in which in addition a $CH_2$ group can also be replaced by —O— or —CH=CH—. Particularly preferred groups R are methyl, ethyl, n-propyl, n-butyl, n-pentyl and n-heptyl.

In the case of compounds of the foregoing partial formulae with two groups R, both groups R each have independently of each other one of the abovementioned meanings.

In the compounds of the formula III $R^1$ and $R^2$ are each independently preferably alkyl, alkoxy or alkoxymethyl with each up to 7 C atoms.

In the compounds of the formula IV $R^1$ and $R^2$ have the preferred meanings indicated above. Preferred compounds of the formula IV are those of the partial formulae IVa to IVf:

| | |
|---|---|
| $R^1$—Phe—COO—Phe—COO—Phe—$R^2$ | IVa |
| $R^1$—Cy—COO—Phe—COO—Phe—$R^2$ | IVb |
| $R^1$—Phe—COO—Cy—COO—Phe—$R^2$ | IVc |
| $R^1$—Phe—OOC—Cy—COO—Phe—$R^2$ | IVd |
| $R^1$—Cy—COO—Cy—COO—Phe—$R^2$ | IVe |
| $R^1$—Cy—COO—Phe—COO—Cy—$R^2$ | IVf |

Of the foregoing partial formulae, those of the formulae IVa, IVb and IVd are preferred.

When the alkyl groups in the compounds of formulae I to IV contain 3 or more carbon atoms, these can be arranged in a straight or branched chain. However, the phases according to the invention did not use any components which contain more than one branched alkyl group. Such branched alkyl groups for the purposes of the present invention contain not more than one chain branching; preferably this is a methyl or ethyl group in the 1- or 2-position of carbon skeleton, so that suitable branched alkyl groups are in particular: 2-methylpropyl, 2-methylbutyl, 1-methylpentyl, 2-methylpentyl, 1-methylhexyl. Generally the liquid crystal dielectrics according to the invention contain only one component having a branched-chain alkyl radical in order to induce, if desired, optical activity. For this purpose; normally not more than 10 percent by weight, preferably 0.5 to 3 percent by weight, of a component having a branched alkyl radical are added.

In the compounds of the foregoing partial formulae,

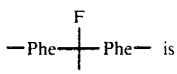

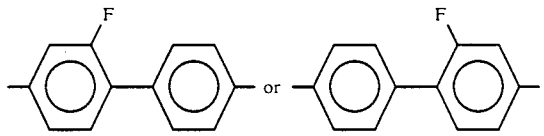

Preferred phases according to the invention contain compounds of the formula III in wich $R^1$ is n-alkyl $R^2$ is n-alkyl, n-alkoxy or n-alkanoyloxy.

$R^1$ and $R^2$ are preferably n-alkyl or n-alkoxy of in each case 2 to 7 C atoms.

The preparation of the phases according to the invention is effected in the conventional manner. In general, the desired amount of the components which is used in the smaller amount is dissolved in the components which constitutes the main constituent, preferably at elevated temperature. If this temperature is chosen to be above the clear point of the main constituent, the completeness of the process of dissolving can be observed particularly easily.

However, it is also possible to mix solutions of the components in a suitable organic solvent, for example acetone, chloroform or methanol, and to remove the solvent after thorough mixing, for example by distillation under reduced pressure. It is self-evident that with this method it must be ensured that the solvent does not introduce any contaminants or undesirable dopants.

By means of suitable additives the liquid crystal phases according to the invention can be modified in such a way that they can be used in any hitherto disclosed kind of supertwisted nematic liquid crystal display element.

The production of a supertwisted nematic electro-optical cell containing a phase in accordance with the invention can also be carried out in a manner known per se; for example, by evacuating a suitable cell and introducing the mixture into the evacuated cell.

The examples below serve to illustrate the invention without limiting it. In the examples, the melting point and clear point of a liquid crystal substance are given in degrees Celsius. The percentages are by weight. The values of the threshold voltages relate to an angle of observation of 0°, 10% contrast and 20° C. and are voltages in a 90° twist cell.

Example 1

A liquid crystal phase consisting of
3% of 4-cyanobiphenyl-4'-yl p-(n-heptylphenyl)-benzoate
10% of 2-fluoro-4-pentylphenyl p-(heptylphenyl)-benzoate
14% of 4-cyano-4'-(trans-4-pentylcyclohexyl)-biphenyl
7% of 4-cyano-3-fluorophenyl p-propylbenzoate
2% of 4-cyano-3-fluorophenyl p-ethylbenzoate
10% of 2-fluoro-4-pentylphenyl trans-4-(trans-4-pentyl-cyclohexyl)-cyclohexane carboxylate
14% of 2-p-cyanophenyl-5-propyl-1,3-dioxane
8% of 2-fluoro-4-pentylphenyl trans-4-propylcyclohexane carboxylate
16% of 2-fluoro-4-pentylphenyl trans-4-pentylcyclohexane carboxylate and
16% of 2-fluoro-4-pentylphenyl trans-4-heptylcyclohexane carboxylate has a clearing point of 85.4°, an optical anisotropy of 0.131, a viscosity of 54.3 mPa.s at 20°, a threshold voltage of 2.22 volt, a dielectric anisotropy of +11.1, and $K_{33}/K_{11}$ of 1.18.

EXAMPLE 2

A liquid crystal phase consisting of
8.6% of 1-(trans-4-propylcyclohexyl)-2-(4'-pentyl-2-fluorobiphenyl-4-yl)-ethane
8.7% of 1-(trans-4-propylcyclohexyl)-2-(4'-ethyl-2'-fluorobiphenyl-4-yl)-ethane
8.7% of 1-(trans-4-pentylcyclohexyl)-2-(4'-ethyl-2'-fluorobiphenyl-4-yl)-ethane
6% of 4-ethyl-4'-cyanobiphenyl
20% of 2-p-cyanophenyl-5-propyl-1,3-dioxane
20% of 2-p-cyanophenyl-5-pentyl-1,3-dioxane
9% of trans-4-(trans-4-propylcyclohexane)-propoxycyclohexane
2% of 4-cyanobiphenyl-4'-yl p-(heptylphenyl)-benzoate
4% of 4,4'-Bis-(trans-4-propylcyclohexyl)-biphenyl
4% of 4-(trans-4-pentylcyclohexyl)-4'-(trans-4-propylcyclohexyl)-biphenyl and
9% of trans-4-pentylcyclohexyl trans-4-(trans-4-butylcyclohexyl)-cyclohexane carboxylate has a clearing point of 86.9°, an optical anisotropy of 0.130, a viscosity of 32.3 mPa.s at 20°, and threshold voltage of 2.28 volt, a dielectric anisotropy of +11.2 and $K_{33}/K_{11}$ of 1.27.

EXAMPLE 3

A liquid crystal phase consisting of
3.0% of 4-cyanobiphenyl-4'-yl p-(heptylphenyl)-benzoate
10.0% of 2-fluoro-4-pentylphenyl p-(heptylphenyl)-benzoate
14.0% of 4-cyano-4'-(trans-4-pentylcyclohexyl)-biphenyl
7.0% of 4-cyano-3-fluorophenyl p-propylbenzoate
2.0% of 4-cyano-3-fluorophenyl p-ethylbenzoate
10.0% of 2-fluoro-4-pentylphenyl trans-4-(trans-4-pentylcyclohexyl)-cyclohexane carboxylate
14.0% of 2-p-cyanophenyl-5-propyl-1,3-dioxane
12.6% of p-propylphenyl trans-4-propylcyclohexane carboxylate
15.4% of p-pentylphenyl trans-4-propylcyclohexane carboxylate
and
12.0% of p-heptylphenyl trans-4-propylcyclohexane carboxylate has a clearing point of 85.2°, an optial anisotropy of 0.131, a viscosity of 45.3 mPa.s at 20°, a threshold voltage of 2.21 volt, a dielectric anisotropy of +11.2, and $K_{33}/K_{11}$ of 1.16.

The mixture of Example 1 is a good starting point when designing supertwisted displays. If the initial test cells containing this phase show insufficient threshold sharpness, the mixture of Example 2 may be added in order to introduce hysteresis and obtain an optimised transmission vs voltage curve in the test cell. Similarly, the mixture of Example 3 may be added if necessary in order to reduce excess hysteresis. The driving voltage should then be adjusted to provide the correct switching voltages for the tuned cell.

The mixtures of Examples 1 to 3 are undoped and suitable chiral additives and have to be used to obtain the desired d/p relationship. These additives are readily available and known to the skilled worker.

The three mixtures may also be mixed together in any proportion to obtain intermediate properties.

EXAMPLE 4

A liquid crystal phase is prepared consisting of
3% of 4-cyanobiphenyl-4'-yl p-(n-heptylphenyl)-benzoate
8% of 2-fluoro-4-pentylphenyl p-(heptylphenyl)-benzoate
14% of 4-cyano-4'-(trans-4-pentylcyclohexyl)-biphenyl
7% of 4-cyano-3-fluorophenyl p-propylbenzoate
2% of 4-cyano-3-fluorophenyl p-ethylbenzoate
10% of 2-fluoro-4-pentylphenyl trans-4-(trans-4-pentylcyclohexyl)-cyclohexane carboxylate
14% of 2-p-cyanophenyl-5-propyl-l,3-dioxane
2% of p-(p-propylphenoxycarbonyl)-phenyl trans-4-cyclohexan carboxylate
8% of 2-fluoro-4-pentylphenyl trans-4-propylcyclohexane carboxylate
16% of 2-fluoro-4-pentylphenyl trans-4-pentylcyclohexane carboxylate and
16% of 2-fluoro-4-pentylphenyl trans-4-heptylcyclohexane carboxylate.

EXAMPLE 5

A liquid crystal phase consisting of
16.6% of 1-(trans-4-propylcyclohexyl)-2-(4'-ethyl-2-fluorobiphenyl-4-yl)-ethane
16.7% of 1-(trans-4-propylcyclohexyl)-2-(4'-pentyl-2'-fluorobiphenyl-4-yl)-ethane
16.7% of 1-(trans-4-pentylcyclohexyl)-2-(4'-ethyl-2'-fluorobiphenyl-4-yl)-ethane
10% of 4-ethyl-4'-cyanobiphenyl
10% of 4-propyl-4'-cyanobiphenyl
15% of 4-pentyl-4'-cyanobiphenyl
5% of 4,4'-bis-(trans-4-propylcyclohexyl)-2-fluorobiphenyl,
5% of 4,4'-bis-(trans-4-pentylcyclohexyl)-2-fluorobiphenyl and
5% of 4-(trans-4-pentylcyclohexyl)-4'-(trans-4-propyl-cyclohexyl)-2 fluorobiphenyl has a clearing point of 97.5°, a transition point smectic-nematic of < −20°, a viscosity of 33.1 mPa.s at 20°, an optical anisotropy of 0.179 and shows good properties in SBE devices.

EXAMPLE 6

A liquid crystal phase consisting of
6,6% of 1-(trans-4-propylcyclohexyl)-2-(4'-ethyl-2'-fluorobiphenyl-4-yl)-ethane
6,7% of 1-(trans-4-propylcyclohexyl)-2-(4'-pentyl-2'-fluorobiphenyl-4-yl)-ethane
6,7% of 1-(trans-4-pentylcyclohexyl)-2-(4'-ethyl-2'-fluorobiphenyl-4-yl)-ethane
25% of 1-(trans-4-propylcyclohexyl)-2-(p-cyanophenyl)ethane
20% of trans,trans-4-propyl-4'-cyanocyclohexylcyclohexane
10% of 2-p-cyanophenyl-5-propyl-l,3-dioxane
5% of 4,4'-bis-(trans-4-propylcyclohexyl)-2-fluorobiphenyl
5% of 4,4'-bis-(trans-4-pentylcyclohexyl)-2-fluorobiphenyl
5% of 4-(trans-4-pentylcyclohexyl)-4'-(trans-4-propylcyclohexyl)-2-fluorobiphenyl
5% of trans-4-pentylcyclohexyl 4-(trans-4-propylcyclohexyl)-cyclohexane carboxylate
and
5% of trans-4-pentylcyclohexyl 4-(trans-4-butylcyclohexyl)-cyclohexane carboxylate
shows good properties in SBE devices.

EXAMPLE 7

A liquid crystal phase consisting of
9,2% of 1-(trans-4-propylcyclohexyl)-2-(4'-ethyl-2'-fluorobiphenyl-4-yl)-ethane,
9,1% of 1-(trans-4-propylcyclohexyl)-2-(4'-pentyl-2'-fluorobiphenyl-4-yl)-ethane,
9,2% of 1-(trans-4-pentylcyclohexyl)-2-(4'-ethyl-2'-fluorobiphenyl-4-yl)-ethane,
22,5% of 1-(trans-4-propylcyclohexyl)-2-(p-cyanophenyl)ethane,
15% of trans,trans-4-propyl-4'-cyanocyclohexylcyclohexane,
5% of 2-p-cyanophenyl-5-propyl-l,3-dioxane,
5% of 4-cyano-3-fluorophenyl p-propylbenzoate,
5% of 4,4'-Bis-(trans-4-propylcyclohexyl)-2-fluorobiphenyl,
5% of 4,4'-Bis-(trans-4-pentylcyclohexyl)-2-fluorobiphenyl,
5% of 4-(trans-4-pentylcyclohexyl)-4'-(trans-4-propylcyclohexyl)-2-fluorobiphenyl,
5% of trans-4-pentylcyclohexyl trans-4-(trans-4-propylcyclohexyl)-cyclohexane carboxylate
and
5% of trans-4-pentylcyclohexyl trans-4-(trans-4-butylcyclohexyl)-cyclohexane carboxylate has a clearing point of 96.8°, a transition point smectic-nematic of < −20°, a viscosity of 33.5 mPa.s at 20°, an optical anisotropy of 0.122 and shows good properties in SBE devices.

The mixtures of example 7 and example 5 are suitable as a two-bottle system with variable birefringence for STN devices. This system is especially useful for STN displays with twist angles of 180 degrees–220 degrees, incorporating a variable birefringence to allow matching to precise cell twist angle and thickness. Both mixtures are miscible in all proportions, providing a range of $\Delta n$ from 0.179 to 0.122, and a near constant threshold voltage of 2.03 V–2.04 V in 180 degrees twist cells (7 μm, 180 °C. twist, low surface tilt cell, d/p=0.375, d.$\Delta n$=0.95). The high clearing points minimise undesirable variation in colour at elevated operating temperatures.

A suitable birefringence for a 7 μm STN cell is obtained by mixing 21.8 parts of the mixture of example 5 with 78.2 parts of the mixture of example 7. The resulting liquid crystal phase shows an optical anisotropy of 0.1357 which gives the optimal optical path difference for a 180° twist STN cell with 7 μm thickness (d.$\Delta n$=0.95).

Electro-optical measurements were taken using a white light source in positive contrast mode with both polarisers parallel and the input polariser was at an angle of 45° to the input director:

$V_{90,0,20}$: 1.92
$V_{10,0,20}$: 2.05
$V_{90,45,20}$: 1.86
$V_{50,10,20}$: 1.96
$M_{20}$: 1.10
$M_{20}'$: 1.05

EXAMPLE 8

A liquid crystal phase consisting of

25% of 1-(trans-4-ethylcyclohexyl)-2-(4'-ethyl-2'-fluorobiphenyl-4-yl)-ethane,
25% of 1-(trans-4-propylcyclohexyl)-2-(4'-ethyl-2'-fluorobiphenyl-4-yl)-ethane,
10% of 4-ethyl-4'-cyanobiphenyl,
15% of 4-pentyl-4'-cyanobiphenyl,
10% of 1-(trans-4-propylcyclohexyl)-2-(p-cyanophenyl)-ethane,
5% of 4,4'-Bis-(trans-4-propylcyclohexyl)-2-fluorobiphenyl,
5% of 4,4'-Bis-(trans-4-pentylcyclohexyl)-2-fluorobiphenyl,
5% of 4-(trans-4-pentylcyclohexyl)-4'-(trans-4-propylcyclohexyl)-2-fluorobiphenyl has a clearing point of 88.4°, a transition point smectic-nematic < −20°, a viscosity of 29.9 mPa.s at 20°, and an optical anisotropy of 0.167.

In a 6 mm thick, 180° twist angle STN cell doped with S811 such that d/p=0.35 electro-optical measurements were taken using a white light source operating the cell in positive contrast mode, with parallel polarisers the input polariser being at an angle of 45° to the input director:

$V_{90,0,20} = 2.00$
$V_{10,0,20} = 2.15$
$V_{10,0,20} V_{90,0,20} = 1.075$

EXAMPLE 9

A liquid crystal phase consisting of

25% of 1-(trans-4-ethylcyclohexyl)-2-(4'-ethyl-2'-fluorobiphenyl-4-yl)-ethane,
25% of 1-(trans-4-propylcyclohexyl)-2-(4'-ethyl-2'-fluorobiphenyl-4-yl)-ethane,
10% of 4-ethyl-4'-cyanobiphenyl,
13% of 4-pentyl-4'-cyanobiphenyl,
12% of 1-(trans-4-propylcyclohexyl)-2-(p-cyanophenyl)ethane,
7.5% of 4,4'-Bis-(trans-4-propylcyclohexyl)-2-fluorobiphenyl and
7.5% of 4-(trans-4-pentylcyclohexyl)-4'-(trans-4-propylcyclohexyl)-2-fluorobiphenyl has a clearing point of 88.9°, a transition point smectic-nematic of < −20°, a viscosity of 29.5 mPa.s at 20° and an optical anisotropy of 0.166.

In a 6 μm thick, 180° twist STN cell with S811 dopant such that d/p=0.35 electro-optical measurements were taken using a white light source operating the cell in positive contrast mode, with parallel polarisers the input polariser being at an angle of 45° to the input director:

$V_{90,0,20} = 2.05$
$V_{10,0,20} = 2.22$
$V_{10}/V_{90} = 1.083$

EXAMPLE 10

A liquid crystal phase consisting of 9.1% of 1-(trans-4-propylcyclohexyl)-2-(4'-ethyl-2'-fluorobiphenyl-4-yl)-ethane,
9.1% of 1-(trans-4-pentylcyclohexyl)-2-(4'-ethyl-2'-fluorobiphenyl-4-yl)-ethane,
9.1% of 1-(trans-4-propylcyclohexyl)-2-(4'-pentyl-2'-fluorobiphenyl-4-yl)-ethane,
14.9% of trans,trans-4-propyl-4'-propoxycyclohexylcyclohexane,
5.2% of 2-p-cyanophenyl-5-propyl-1,3-dioxane,
5.0% of 4-cyano-3-fluorophenyl p-propylbenzoate,
9.9% of 2-fluoro-4-pentylphenyl trans-4-(trans-4-pentylcyclohexyl)-cyclohexane carboxylate,
22.6% of 1-(trans-4-propylcyclohexyl)-2-(p-cyanophenyl)ethane,
5.0% of 4,4'-Bis-(trans-4-propylcyclohexyl)-2-fluorobiphenyl,
5.1% of 4,4'-Bis-(trans-4-pentylcyclohexyl)-2-fluorobiphenyl and
5.0% of 4-(trans-4-pentylcyclohexyl)-4'-(trans-4-propylcyclohexyl)-2-fluorobiphenyl has a clearing point of 93.4°, a viscosity of 24.6 mPa.s at 20°, an optical anisotropy of 0.121 and shows good properties in supertwisted nematic devices.

We claim:

1. In a supertwisted nematic cell comprising a liquid crystal phase, the improvement wherein said phase comprises at least three components A, B and C, each of which contains one or more compounds, wherein component A is present in an amount of 10–70% by weight and has a viscosity of at most about 25 mPa.s at 20°, a clearing point of at most 130° and a dielectric anisotropy between about −2 and +2, component B is present in an amount of 15 to 50% by weight and has a dielectric anisotropy above about +8, component C is present in an amount of 5 to 30% by weight and has a clearing point of more than 130° and a dielectric anisotropy between about −2 and about +2, and wherein component A contains at least one compound of the formula III

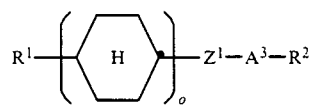

in which
R¹ is alkyl of 1 to 12 C atoms, in which in addition one or two non-adjacent CH₂ groups can be replaced by 0 atoms, —CO—, —O—CO—, —CO—O— and/or —CH=CH— groups,
R² has one of the meanings of R¹,

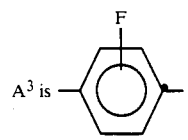

o is 1 or 2.

2. Liquid crystal phase according to claim 1, wherein component B contains at least one compound of the formula I

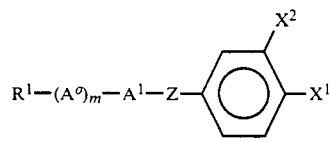

in which
R¹ is alkyl of 1 to 12 C atoms, in which in addition one or two nonadjacent CH₂ groups can be replaced by 0 atoms, —CO—, —O—CO—, —CO—O— and-/or —CH=CH— groups, $A^o$ and $A^1$ are each, independently of each other, Cy, Dio, Pyr or Phe,
Z is —CO—O—, —O—CO—, —CH$_2$O—, —O—CH$_2$— or a single bond,
$X^1$ is F, Cl or —CN,
$X^2$ is F or Cl,
m is 0 or 1,
Cy is trans-1,4-cyclohexylene,
Pyr is pyrimidine-2,5-diyl or pyridine-2,5-diyl,
Dio is trans-1,3-dioxane-2,5-diyl and
Phe is 1,4-phenylene.

3. A cell according to claim 1 wherein compound B contains at least one compound of the formula II

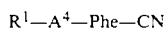   II in which
$A^4$ is Cy, Cy—CH , Phe, Dio, Phe—COO, Cy—COO, Phe—Phe, Phe—COO—Phe, Cy—Phe—COO—Phe, Phe—Phe—COO—Phe, Cy—Cy, Cy—Cy—CH$_2$CH$_2$, Cy—CH$_2$CH$_2$—Cy, Cy—Phe or Cy—COO—Phe
and $R^1$, has the meaning indicated in claim 1 and Cy is trans-1,4-cyclohexylene and Phe is 1,4-phenylene.

4. A cell according to claim 1 wherein component B contains at least one compound of the formula

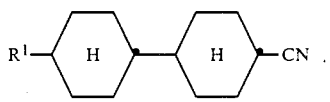

and/or of the formula

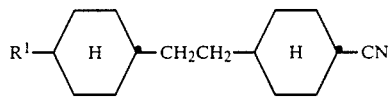

in which $R^1$ has the meaning indicated above.

5. A cell according to claim 1 wherein component C contains at least one compound of the formula IV

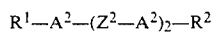   IV in which $Z^2$ independently is —CO—O— or —O—CO—, $A^2$ is trans-1,4-cyclohexylene or 1,4-phenylne and $R^1$ and $R^2$ independently have the meanings indicated above.

6. A cell according to claim 1 wherein component C contains at least one compound of the formulae

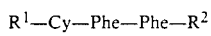

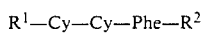

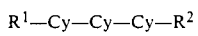

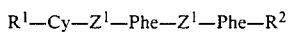

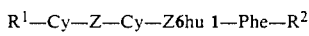

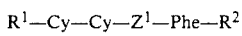

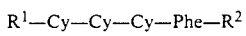

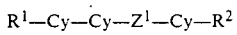

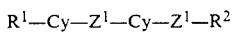

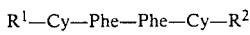

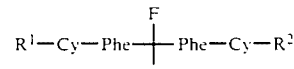

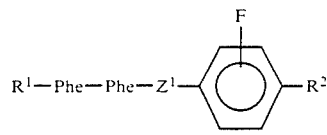

where Cy is trans-1,4-cyclohexylene and Phe is 1,4-phenylene.

7. Supertwisted nematic electro-optical display element, characterized in that it contains a cell according to claim 1.

8. In a supertwisted nematic cell comprising a liquid crystal phase, the improvement wherein said phase comprises at least three components A, B and C, each of which contains one or more compounds, wherein component A is present in an amount of 10–70% by weight and has a viscosity of at most about 25 mPa.s at 20°, a clearing point of at most 130° and a dielectric anisotropy between about −2 and +2, component B is present in an amount of 15 to 50% by weight and has a dielectric anisotropy above about +8, component C is present in an amount of 5 to 30% by weight and has a clearing point of more than 130° and a dielectric anisotropy between about −2 and about +2, and wherein component A contains at least one compound or formula IIIg

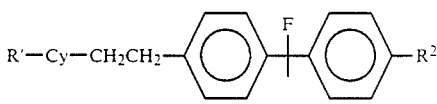   IIIg wherein
Cy is trans-1,4-cyclohexylene and
$R^1$ and $R^2$ each independently are $C_{1-2}$-alkyl in which one or two non-adjacent CH$_2$ groups may be replaced by O, —CO—, —O—CO—, —CO—O—, and/or —CH=CH—.

9. A cell according to claim 8, wherein component B contains at least one compound of formula I

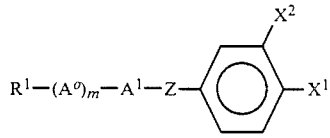   I in which
$R^1$ is alkyl of 1 to 12 C atoms, in which in addition one or two non-adjacent CH$_2$ groups can be replaced by 0 atoms, —CO—, —O—CO—, —CO—O— and/or —CH=CH— groups,
$A^o$ and $A^1$ are each, independently of each other, Cy, Dio, Pyr or Phe,
Z is —CO—O—, —O—CO—, —CH$_2$—O—, —O—CH$_2$— or a single bond,
$X^1$ is F, Cl or —CN,
$X^2$ is F or Cl,
m is 0 or 1,
Cy is trans-1,4-cyclohexylene,
Pyr is pyrimidine-2,5-diyl or pyridine-2,5-diyl,
Dio is trans-1,3-dioxane-2,5-diyl and
Phe is 1,4-phenylene.

* * * * *

UNITED STATES PATENT AND TRADEMARK OFFICE
CERTIFICATE OF CORRECTION

PATENT NO. : 5,055,224
DATED : October 8, 1991
INVENTOR(S) : Ian C. SAGE et al.

It is certified that error appears in the above-identified patent and that said Letters Patent is hereby corrected as shown below:

COLUMN 15, LINE 17:

In Claim 3, Line 5 reads - - - -

"$A^4$ is Cy, Cy-CH"

Should read - - - -

--$A^4$ is Cy, Cy-$CH_2$, $CH_2$--

COLUMN 15, LINE 60:

In Claim 6, Line 7 reads

"$R^1$-Cy-Z-Cy-Z6hu 1-Phe-$R^2$"

Should read - - - - - -
--$R^1$-Cy-$Z^1$-Cy-$Z^1$-Phe-$R^2$--

Signed and Sealed this

Sixth Day of April, 1993

*Attest:*

STEPHEN G. KUNIN

*Attesting Officer*    Acting Commissioner of Patents and Trademarks

UNITED STATES PATENT AND TRADEMARK OFFICE
CERTIFICATE OF CORRECTION

PATENT NO. : 5,055,224

DATED : October 8, 1991

INVENTOR(S) : Sage et al.

It is certified that error appears in the above-identified patent and that said Letters Patent is hereby corrected as shown below:

Column 14:

Claim 1, line 24 reads - - - - o is 1 or 2.

Should read - - - -

$Z^1$ is -CO-O-, -O-CO- or -$CH_2CH_2$-, o is 1 or 2.

Column 15:

Claim 6, line 7 reads - - - -

$R^1$-Cy-Z-Cy-Z6hu1-Phe-$R^2$

Should read - - - -

$R^1$-Cy-$Z^1$-Cy-$Z^1$-Phe-$R^2$

UNITED STATES PATENT AND TRADEMARK OFFICE
CERTIFICATE OF CORRECTION

PATENT NO. : 5,055,224
DATED : October 8, 1991
INVENTOR(S) : Sage et al.

It is certified that error appears in the above-identified patent and that said Letters Patent is hereby corrected as shown below:

Column 15:

Claim 6, line 15 reads - - - - where Cy is trans-1,4-cyclohexylene and Phe is 1,4-phe-

Should read - - - -

$R^1-Cy-Z^1-Phe-Phe-Cy-R^2$ where Cy is trans-1,4-cyclohexylene and Phe is 1,4-phe- Signed and Sealed this Fifteenth Day of June, 1993

Attest:

MICHAEL K. KIRK

Attesting Officer     Acting Commissioner of Patents and Trademarks